US007516485B1

(12) United States Patent
Lee et al.

(10) Patent No.: US 7,516,485 B1
(45) Date of Patent: Apr. 7, 2009

(54) METHOD AND APPARATUS FOR SECURELY TRANSMITTING ENCRYPTED DATA THROUGH A FIREWALL AND FOR MONITORING USER TRAFFIC

(75) Inventors: Michael G. Lee, Ottawa (CA); Leslie D. Owens, Vienna, VA (US)

(73) Assignee: Nortel Networks Limited, St. Laurent, Quebec (CA)

(*) Notice: Subject to any disclaimer, the term of this patent is extended or adjusted under 35 U.S.C. 154(b) by 1151 days.

(21) Appl. No.: 09/865,667

(22) Filed: May 29, 2001

(51) Int. Cl.
*G06F 21/00* (2006.01)
(52) U.S. Cl. .................................. 726/11; 713/153
(58) Field of Classification Search ................. 713/153, 713/201, 189; 709/225; 726/11
See application file for complete search history.

(56) References Cited

U.S. PATENT DOCUMENTS

| 5,983,350 | A | * | 11/1999 | Minear et al. ............... 713/201 |
| 6,438,612 | B1 | * | 8/2002 | Ylonen et al. ............... 709/249 |
| 6,546,486 | B1 | * | 4/2003 | Perlman et al. ............. 713/153 |
| 6,560,705 | B1 | * | 5/2003 | Perlman et al. ............. 713/154 |
| 6,636,838 | B1 | * | 10/2003 | Perlman et al. ............... 705/51 |

OTHER PUBLICATIONS

H. Orman, The Oakley Key Determination Protocal, , Nov. 1998, pp. 1-55.
R. Thayer, IP Security Document Raodmap, Nov. 1998, pp. 1-11.
R. Glenn, The Null Encryption Algorithm and Its Use with IPsec, Nov. 1998, pp. 1-6.
D. Harkins, The Internet Key Exchange (IKE), Nov. 1998, pp. 1-41.
D. Maughan, et al., Internet Security Association and Key Management Protocol (ISAKMP), Nov. 1998, pp. 1-86.
D. Piper, The Internet IP Security Domain of Interpretation for ISAKMP, Nov. 1998, pp. 1-32.
S. Kent, et al., IP Encasulating Security Payload (ESP), Nov. 1998, pp. 1-22.
C. Madson, et al., The ESP DES-CBC Cipher Algorithm with Explicit IV, Nov. 1998, pp. 1-10.
C. Madson, et al., The Use of HMAC-SHA-1-96 within ESP and AH, Nov. 1998, pp. 1-7.

(Continued)

*Primary Examiner*—Andrew L Nalven
(74) *Attorney, Agent, or Firm*—Hunton and Williams, LLP

(57) ABSTRACT

A technique for enabling a firewall device to allow encrypted data to securely pass between networks, and at the same time allow the firewall to selectively monitor the encrypted traffic that is allowed to pass is disclosed. In one embodiment, the technique is realized by detecting an exchange of a first encryption key between a host device and a remote device, and the first encryption key supports confidentiality protection of a first security policy between the host device and the remote device. Next, a second encryption key is exchanged with the host device when the exchange of the first encryption key is detected, and the exchange of the second encryption key supports confidentiality protection of a second security policy between the firewall and the host device. Next, based at least in part upon the second security policy, the first encryption key is requested and the first encryption key is sent under the protection of the second security key and in accordance with the second security policy. Finally, encrypted data is passed when it is determined that the first encryption key is received.

12 Claims, 4 Drawing Sheets

OTHER PUBLICATIONS

C. Madson et al., The Use of HMAC-MD5-96 Within ESP and AH, Nov. 1998, pp. 1-7.

S. Kent, et al., IP Aithentication Header, Nov. 1998, pp. 1-22.

S. Kent, et al., Security Architecture for the Internet Protocol, Nov. 1998, pp. 1-66.

R. Thayer, Security, Bulletproof IP, Nov. 21, 1997, TechWeb, pp. 1-9.

Les Owens, Wireless Security Perspectives, Wireless Application Protocol (WAP) Security: How does it work?, Feb. 2000, vol. 2, No. 2.

Les Owens, Wireless Security Perspectives, CryptoNews: Rijndael Selected for AES, Oct. 2000, vol. 2, No. 9.

Les Owens, Wireless Security Perspectives, EPE—Enhances Privacy and Encryption, Jul. 2000, vol. 2, No. 6.

Les Owens, Wireless Security Perspectives, From Dr. Jon's Wireless Security to Wireless Security Perspectives, Sep. 1999, vol. 1, No. 7.

TimeStep Corporation, Understanding the IPSec Protocol Suite, Dec. 1998, 46 pages.

* cited by examiner

METHOD AND APPARATUS FOR SECURELY TRANSMITTING ENCRYPTED DATA THROUGH A FIREWALL AND FOR MONITORING USER TRAFFIC

FIELD OF THE INVENTION

The present invention relates generally to information security and cryptography and, more particularly, to a technique for enabling a firewall device to allow encrypted data to securely pass between networks, and at the same time allow the firewall to selectively monitor the encrypted traffic that is allowed to pass.

BACKGROUND OF THE INVENTION

The present state of existing firewalls is such that allowing encrypted data to securely pass between networks, while at the same time allowing a firewall to selectively monitor the encrypted traffic, is not possible.

With the present state of the art, a firewall device is often placed at a network entrance (or perimeter) for security purposes. The firewall device allows selective communications (voice, video, data, etc.) to pass between one network and other networks. Often one network is a public network and the other network is a private network. The firewall is placed between the networks to allow only some traffic into the private network and to block all other traffic in order to protect the private network from, among other things, attack from the public network. For example, the firewall application may only allow remote administration sessions (e.g., via the TELNET protocol) from a particular remote computer with a particular Internet Protocol (IP) address, thus blocking all other TELNET attempts. The firewall may also, for example, only allow connections to the Internet to be initiated by host computers within the private network, and all incoming Internet communication attempts will be blocked unless the session has previously been initiated by the host computer on the private network.

Existing firewalls may also monitor and log traffic passing between two networks. As the firewall is a central "chokepoint" through which all data traffic must pass, it provides one possible place to monitor traffic and log information. The information log, if analyzed in real time, may be used to determine when security violations are being attempted and provide an intrusion detection service. The information log may also be used after the fact (i.e., other than real time) in analyzing security violations and also for prosecuting security violators (e.g., forensic analysis).

Currently there is a growing use of encryption technology for data traffic to protect against unauthorized disclosure of information. Encryption, or more generally, cryptography, is a primary means to provide privacy or confidentiality of information. Existing encryption technology allows the sender of data to encrypt (or encipher) data with, for example, a specific cryptographic key so only those parties with the same specific key can decrypt and recover the original data. If a strong algorithm is used and the key is sufficiently long, it is not possible with existing technology for anyone without this key to recover the original data.

Encryption presents problems for existing firewalls. For example, if encrypted data (transformed and unreadable information—or "secret writing" as is meant by cryptography) is applied to a firewall, the firewall may not be able to monitor, log, or perform specific firewall filtering functions on the data.

One problem caused by encrypted traffic is deciding how the firewall will handle encrypted traffic. In general, existing firewall devices do not pass encrypted traffic and will simply block encrypted traffic. One drawback with this approach is that it limits the types of information that can be passed through the firewall.

Another possible mode of operation for existing firewalls is to allow all encrypted traffic to pass. Allowing all encrypted traffic to pass however severely reduces the security provided by the firewall and may open a large "hole" through the firewall. For example, if an existing firewall allows encrypted traffic to pass it must allow all encrypted traffic. That is, the firewall has no way of selectively allowing some, but not all, traffic to pass. For example, the firewall cannot allow encrypted web traffic to pass yet block encrypted TELNET traffic. In other words, the firewall can not perform it's primary filtering function with encrypted traffic.

In addition, with encrypted traffic, existing firewalls have no way of monitoring or logging the traffic intelligently because the data that the firewall needs to examine and log is encrypted and thus hidden from the firewall. In other words, if encrypted traffic is allowed to pass, the firewall cannot examine the encrypted traffic. All the firewall may do is record the encrypted data verbatim; this has no use without the encryption key. One drawback of this approach is that it prevents security policies from being enforced because the firewall cannot log what is happening in an intelligent manner. Without the encryption key, the firewall does not know what the encrypted data represents and thus cannot create logs associated with the data.

One solution in use today that attempts to address some of the above issues is to use a "security gateway" device in conjunction with the firewall. This approach does not really address the same problem, because the security gateway actually generates and terminates the encryption data and does not solve the problems associated with encrypted traffic originating and terminating at the host computers behind the firewall.

The following description illustrates how a security gateway may attempt to address some of these problems, and the shortcoming of using the security gateway approach. The security gateway may perform encryption and decryption on behalf of the host computers. The security gateway may be a hardware device located after the firewall at the interface between the two networks.

One readily apparent drawback if a security gateway is used, is that additional hardware is required and security gateway devices may be relatively expensive.

Another drawback is that the security gateway does not provide protection of traffic all the way to the host computer. Data is encrypted and decrypted at the security gateway and passed in the clear to the host computer. This is much less secure, especially considering that the majority of security threats occur within the so called "trusted" environment. Since data is not encrypted between the host computer and the firewall however, firewall functionality is not affected.

Other drawbacks of this, and other, systems exist.

In view of the foregoing, it would be desirable to provide a technique for security and cryptography which overcomes the above-described inadequacies and shortcomings. More particularly, it would be desirable to provide a technique for enabling a firewall device to allow encrypted data to securely pass between two networks, and at the same time allow the firewall to selectively monitor the encrypted traffic that is allowed to pass in an efficient and cost effective manner.

SUMMARY OF THE INVENTION

According to the present invention, a technique for enabling a firewall to securely pass encrypted data is provided. In one embodiment, the technique is realized by first detecting an exchange of a first encryption key between a host device and a remote device, wherein the first encryption key supports confidentiality protection of first data exchanged between the host device and the remote device according to a first security policy. A policy, in this context, means the negotiation that occurs within a protocol security suite (e.g., IPSec) that allows the two communicating devices to determine common algorithms, parameters, and the like to use when communicating. Next, the technique comprises exchanging a second encryption key with the host device when the exchange of the first encryption key is detected, wherein the exchange of the second encryption key supports confidentiality protection of second data exchanged between the firewall and the host device according to a second security policy. Then, a request is made, based at least in part upon the second security policy, for the first encryption key. According to some aspects of the invention, the first encryption key is sent under the protection of the second encryption key and in accordance with the second security policy. Then, the technique may comprise passing encrypted data when it is determined that the first encryption key is received.

In accordance with other aspects of the present invention, A firewall apparatus for selectively monitoring encrypted data traffic is provided. The firewall apparatus may comprise an exchange detector for detecting an exchange of a first encryption key between a host device and a remote device, wherein the first encryption key enables confidentiality protection of first data exchanged between the host device and the remote device according to a first security policy. In addition, the firewall apparatus may comprise a key exchanger for exchanging a second encryption key with the host device when the exchange of the first key is detected, wherein the exchange of the second encryption key enables confidentiality protection of second data exchanged between the firewall and the host device according to a second security policy. The firewall may also comprise a requester for requesting, based at least in part upon the second security policy, the first encryption key wherein the first encryption key is sent under the protection of the second encryption key and in accordance with the second security policy. In some embodiments, the firewall apparatus may comprise a decryptor for decrypting encrypted data, using the first encryption key, according to a predetermined monitoring policy.

In accordance with further aspects of the present invention, a firewall apparatus for selectively passing protocols and services is provided. The firewall apparatus may comprise an exchange detector for detecting an exchange of a first encryption key between a host device and a remote device, wherein the first encryption key supports confidentiality protection of first data exchanged between the host device and the remote device according to a first security policy. In addition, the firewall apparatus may comprise a key exchanger for exchanging a second encryption key with the host device when the exchange of the first encryption key is detected, wherein the exchange of the second encryption key supports confidentiality protection of second data exchanged between the firewall and the host device according to a second security policy. The firewall apparatus may further comprise a requester for requesting, based at least in part upon the second security policy, the first encryption key, wherein the first encryption key is sent under the protection of the second encryption key and in accordance with the second security policy. In some embodiments, the firewall apparatus may also comprise a decryptor for decrypting encrypted data, using the first encryption key and a filter for applying a predetermined filtering policy to the decrypted data.

Another advantage is that the invention scales to larger systems because as more host computers are added, more secure communications become possible since most of the work is being performed by the host computers. In contrast, with a secure gateway solution, the gateway device has a fixed capacity and to allow more secure communications requires adding an additional secure gateway device with associated additional cost.

Another advantage of the present invention is it is compatible with existing encryption techniques. For example, encryption software protocols such as Internet Protocol Security Suite, commonly referred to as IPSec, are being added to operating system software such as Microsoft Windows 2000™ Server version. It is likely that other operating systems will include IPSec as a standard feature in the future.

As mentioned above, IPSec is a number of protocols provided by the Internet Engineering Task Force (IETF), which encompasses data encryption, data origin authentication, key exchange and other aspects of protecting Internet protocol data. While this invention is described in conjunction with IPSec, other encryption standards and protocols may equally be used, and this should in no way limit the usefulness of this invention to only IPSec.

Another advantage of the invention is that it allows seamless processing of non-encrypted traffic along with encrypted traffic at the firewall. This is important, at least, because there may be a period of time where the firewall may still have to co-exist with existing non-encrypted traffic.

The invention may also enable end-user host computers to perform the encryption of data, rather than the current state of the art which requires a "secure gateway" to perform encryption on behalf of the host computers. By enabling the host computers to perform their own data encryption the secure gateway is not required, resulting in considerable cost savings and a more scalable solution. That is, the computationally-intensive cryptographic processing is distributed to all the individual hosts.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
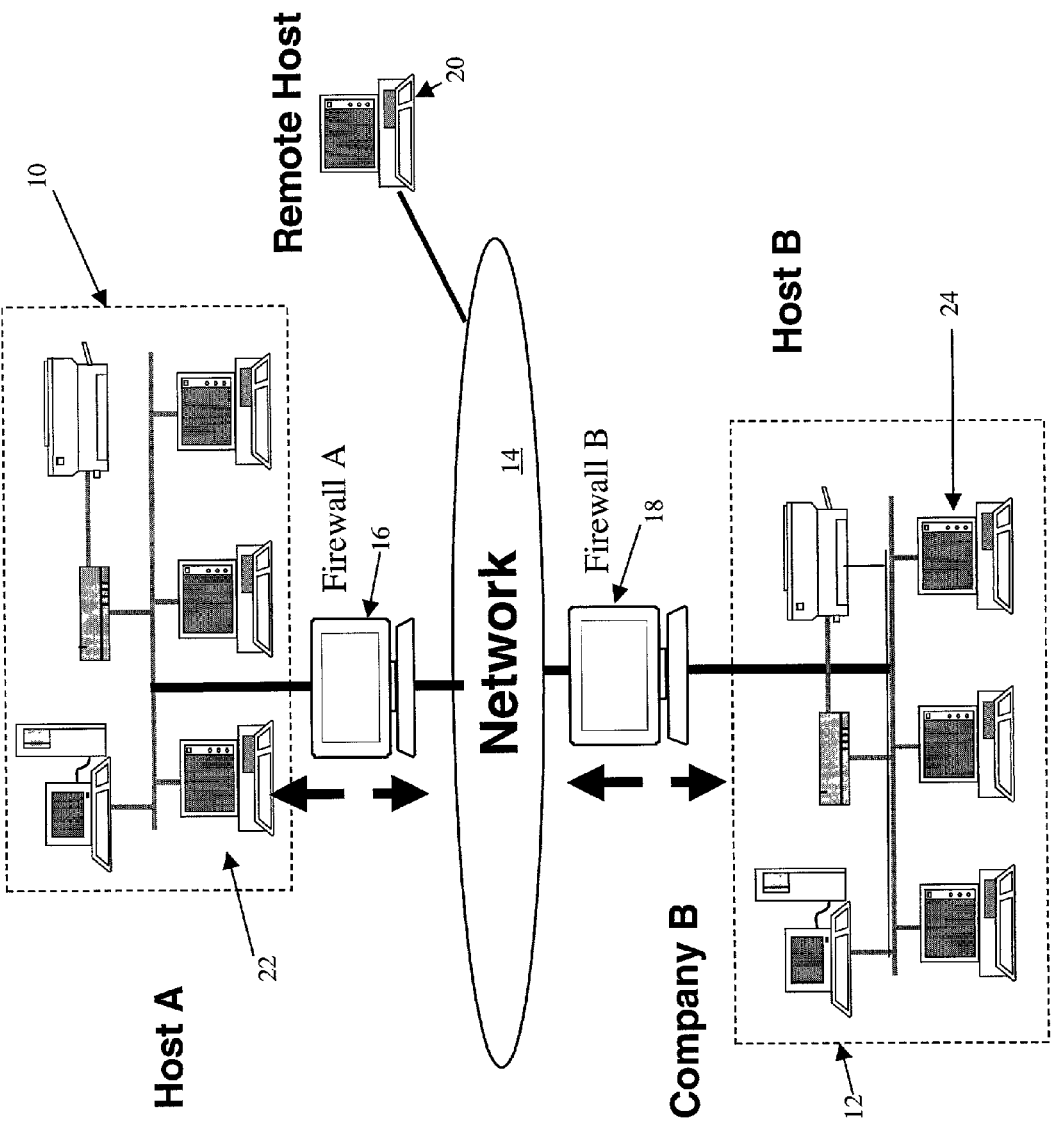
FIG. 1 is a network diagram showing the general topology of interconnected networks in accordance with one embodiment of the present invention.

FIG. 1 is a network diagram showing the general topology of interconnected networks. The networks may comprise any combination of processor based devices that are enabled to communicate via the networks. For example, processor based devices such as personal computers (PCs), work stations, laptops, personal digital assistants (PDAs), Web enabled televisions, Web enabled telephones and other devices may communicate via a wired, wireless, or other network.

As shown, an interconnected network may comprise one or more smaller networks that may communicate over a larger network. For example, network 10 may be a private Local Area Network (LAN), that may communicate via a larger network 14 (e.g., the Internet) with another private network 12. Of course, other configurations are possible. For example, networks 10 and 12 may comprise public or private Wide Area Networks (WANS), wireless networks, other network configuration, or even a single processor based machine enabled to communicate over network 14. Likewise, network 14 may comprise any appropriate public or private network over which network traffic may be communicated. In addition, while FIG. 1 shows two networks (e.g., network 10 and network 12) communicating over network 14, the present invention is applicable to communication between any number of networks.

As known in the art, each network may comprise any number of connected processor devices. For example, network 10 may comprise a number of processor devices which may function as host computer devices which communicate over network 10 and network 12 may comprise a number of processor devices which may function as host computer devices which communicate over network 12. For example, network 10 may comprise a host device 22 and network 12 may comprise a host device 24.

In some embodiments, one or more of the networks may be protected by a firewall device. Any suitable firewall device may be used. For example, firewall device may comprise a Checkpoint Firewall-1 as manufactured by Checkpoint Corporation. Other types of firewall devices may be used.

Figure 2:
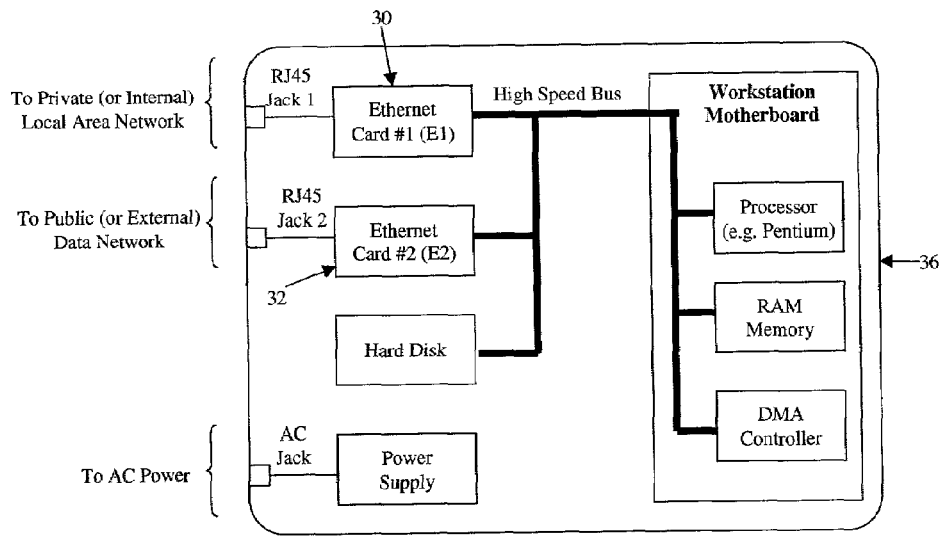
FIG. 2 shows a high level block diagram of a firewall according to one embodiment of the invention.

FIG. 2 shows a high level block diagram of a firewall according to one embodiment of the invention. In some embodiments, firewall 36 may comprise software running on a dual-homed workstation. In some embodiments, a dual-homed workstation may comprise a processor based workstation with multiple network interface cards (e.g., interface card 30 and interface card 32). In such embodiments, the firewall function may be provided by software running on the workstation. In other embodiments, a hardware implementation of firewall 36 may be used to increase the speed of the device.

In some embodiments, a firewall device may filter and regulate data traffic in order to allow or deny specific data communication between networks. For example, network 10 may communicate with network 14 via firewall 16 and network 12 may communicate with network 14 via firewall 18. While a single firewall (e.g., firewall 16, 18) is shown for each network, the invention is not so limited. Any number of firewall devices may be used in any suitable connection scheme such as the "Chapman" architecture and the "Belt and Suspenders Architecture." See, *Firewalls and Internet Security*, by William Cheswick and Steven Bellovin.

In some embodiments, a remote host 20 may communicate over network 14 with either network 10 or network 12. Remote host 20 may comprise any suitable processor device. For example, remote host may comprise a single personal computer or workstation connected to network 14 via an Internet service provider (ISP) (connection may be accomplished via a dial-up modem, digital subscriber line (DSL) or other connection).

Figure 3:
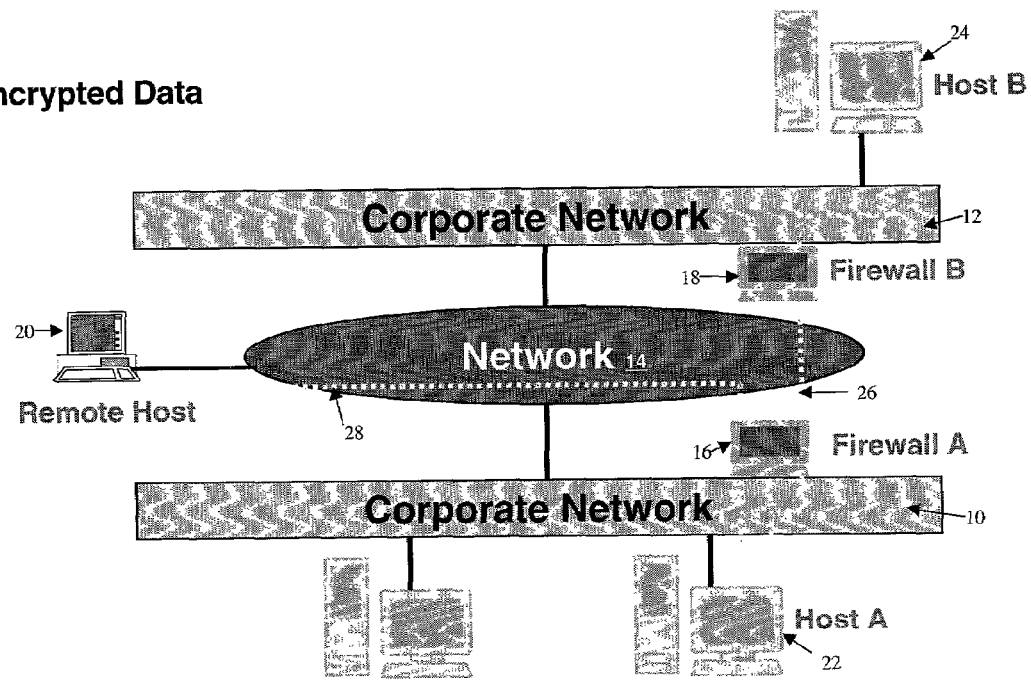
FIG. 3 is a schematic illustration of communication of encrypted data according to one embodiment of the invention.

In some embodiments, encrypted data may be communicated between network host devices. FIG. 3 is a schematic illustration of communication of encrypted data according to one embodiment of the invention. As shown, encrypted data may be communicated between host 24 and host 22 over path 26. Similarly, host 22 may communicate encrypted data with remote host 20 over path 28.

Figure 4:
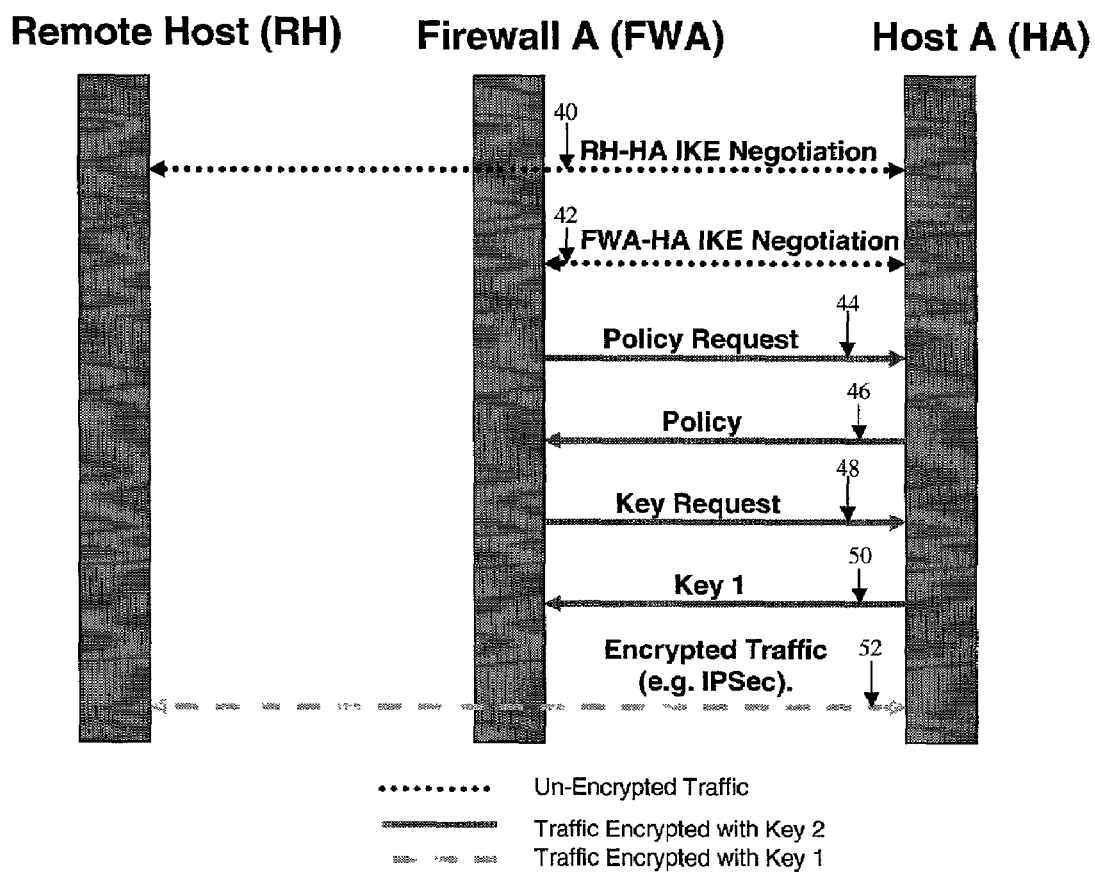
FIG. 4 is a high level schematic of an interaction between a host, a firewall, and a remote host according to one embodiment of the invention.

FIG. 4 is a high level protocol diagram showing the interaction between a host (HA), the corresponding network firewall (FWA), and a remote host (RH) according to one embodiment of the invention. For example, the interaction shown in FIG. 4 may correspond to an interaction between host 22, firewall 16, and remote host 20.

As indicated, an Internet Key Exchange (IKE) protocol between the remote host (RH) and host (HA) may be allowed to pass through the firewall (FWA). IKE traffic may be allowed to pass through the firewall by allowing all user datagram protocol (UDP) communications to or from UDP port 500 to pass through the firewall because UDP port 500 is reserved for IKE use exclusively. In some embodiments, the IKE traffic is non-encrypted at this point. As a result of the IKE negotiation, a first key (Key 1) and a security policy may be shared between HA and RH. The security policy contains the details of the security algorithms to use and which data to which the algorithms apply. For example, the security policy may contain information such as which encryption algorithm to use for encrypted data (e.g., digital encryption standard (DES), triple DES (3-DES), advanced encryption algorithm (AES)), or which data origin authentication algorithm to use (e.g., hashed message authentication algorithm with message digest 5 (HMAC-MD5), or hashed message authentication algorithm with system hash algorithm 1 (HMAC-SHA1)). Security policies may also comprise other information.

In some embodiments, FWA monitors for IKE traffic passing between the public and private network. Once the IKE exchange between RH and HA is detected (e.g., by looking for UDP traffic to destination port 500 on any host device), another IKE negotiation between FWA and HA may occur. The IKE negotiation between FWA and HA may result in sharing a security policy and a second key (Key 2) between FWA and HA as indicated at 42.

For example, If FWA detects IKE traffic passing between HA and RH, the FWA may set up a separate secure channel between the FWA and HA on the private network. The secure channel can be established, for example, by using IKE and IPSec between FWA and HA. Alternatively, the FWA may set up a pre-existing secure channel between itself and each host using IKE and IPSec prior to detecting any IKE traffic between HA and RH.

At 44, FWA requests the security policy negotiated between RH and HA at step 40 in order to be able to know what encryption and authentication algorithms are being used between RH and HA, so that the firewall will be in a position to decrypt the traffic if necessary. At 46, HA may supply FWA with the policy negotiated between RH and HA at step 40.

At 48, FWA may request the key negotiated between RH and HA (Key 1) at 40. If, at 50, HA supplies a key (e.g., Key 1) to FWA, then FWA may enable encrypted traffic to pass as indicated at 52. As long as the FWA and HA have a secure channel, (i.e., they have a shared key 2 and know what algorithms to use (e.g., security policy 2)), HA may easily send the key 1 securely. Protocol messages may be defined and sent so that both ends (e.g., FWA and HA) understand what is being requested and sent.

If FWA does not receive the requested information from HA the FWA may not allow encrypted traffic to pass between HA and RH. FWA will be able to identify and discard any encrypted traffic between HA and RH by looking for the IPSec Encapsulation Security Payload (ESP) protocol number in the IP protocol header and not passing that data.

In some applications it may be desirable to monitor encrypted traffic. For example, FWA may require that the encrypted traffic be examined and or logged for specific legal and/or corporate policy reasons. The invention permits monitoring of encrypted traffic as follows.

First, the firewall (FWA) obtains the encryption key (Key 1) and security policy regarding the secure channel between HA and RH. Then, once the key is obtained, FWA may selectively decrypt traffic as necessary between HA and RH. FWA may not decrypt all traffic between HA and RH because this can be CPU intensive, but FWA retains the ability to monitor and decrypt traffic as necessary. Not all traffic must be monitored since just knowing that traffic may be monitored will thwart most policy compromises. In some embodiments, another option is for FWA to record the encrypted traffic along with the key and security policy for off-line examination at a later time if necessary.

In addition, the invention enables selective firewall policy to be applied to encrypted traffic between host A and remote host, as opposed to current firewalls which will either just allow or disallow all encrypted traffic.

As noted above, existing firewalls apply specific policy to allow and disallow certain types of traffic to pass between the two networks. There are different types of firewalls such as packet filtering, stateful packet filtering, and application level firewalls. The difference between firewall types is based upon, among other things, how deep these firewalls look into the data packets and whether state is kept on these packets. With encrypted data all these types of firewalls do not work since the necessary data is encrypted and not visible to the firewall.

The present invention enables a firewall to decrypt data and then specific firewall policy may be applied. Finally, the data may be re-encrypted and sent to the recipient.

Some embodiments, of the present invention enables selective passing of data as follows. First, the key (e.g., Key 1) and security policy for the secure channel between a host (e.g., HA) and remote host (e.g., RH) is obtained as described above.

The firewall (e.g., FWA) may then decrypt all packets between the host (HA) and remote host (RH). The firewall may then apply the firewall filtering policy to the decrypted data. Any type of firewall filtering (e.g., packet filtering, stateful packet filtering, application gateway, etc.) may be used.

The firewall may then re-encrypt the packet and send it to the recipient (e.g., either HA or RH, depending on who sent the packet initially).

While the above examples are described in reference to the IPSec protocol, the invention is not so limited. Other protocols may be used.

Figure 5:
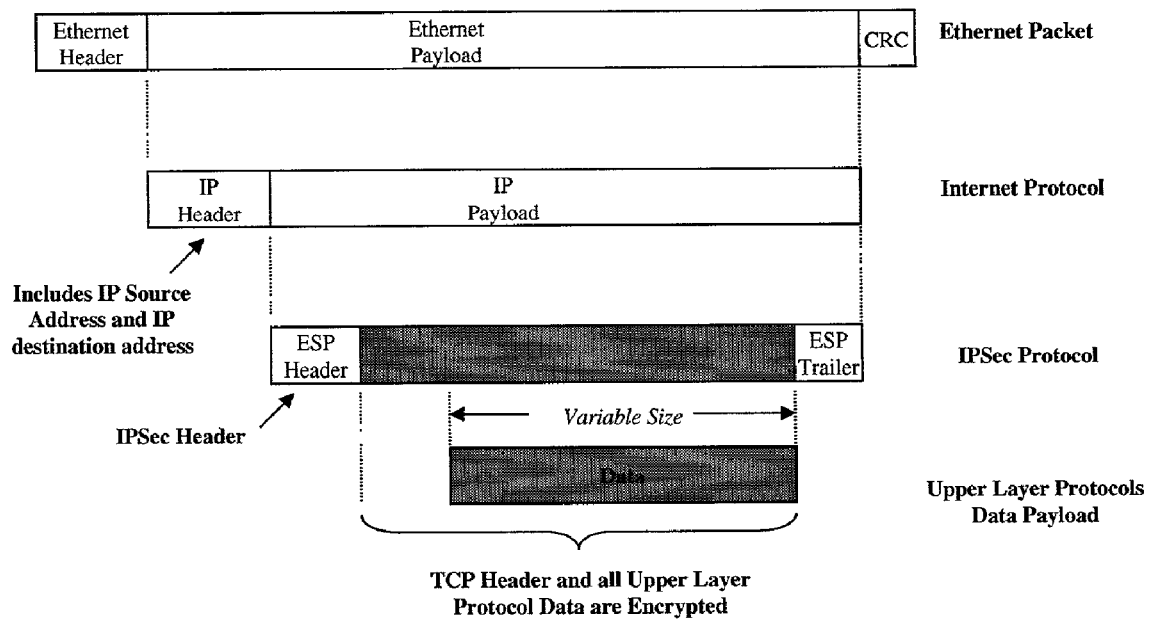
FIG. 5 is a schematic of a data packet using IPSec encryption according to one embodiment of the invention.

FIG. 5 shows a packet diagram implementing IPSec encryption. The particular IPSec service illustrated is encapsulation security payload (ESP) service in transport mode, with the optional encryption turned on. Everything beyond the IP header is encrypted and thus hidden.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for enabling a firewall to securely pass encrypted data, the method comprising:

detecting, at a firewall, an exchange of a first encryption key between a host device and a remote device, wherein the first encryption key supports confidentiality protection of first data exchanged between the host device and the remote device according to a first security policy, and wherein detecting the exchange is initiated by the firewall;

exchanging a second encryption key between the firewall and the host device when the exchange of the first encryption key is detected at the firewall, wherein the exchange of the second encryption key supports confidentiality protection of second data exchanged between the firewall and the host device according to a second security policy;

requesting, at the firewall, based at least in part upon the second security policy, the first encryption key from the host device, wherein the first encryption key is sent under the protection of the second encryption key and in accordance with the second security policy; and passing encrypted data when it is determined that the first encryption key is received.

2. The method of claim 1, further comprising:

not allowing encrypted data to pass when it is determined that the first encryption key is not received.

3. The method of claim 1, wherein the step of detecting an exchange of a first encryption key further comprises:

monitoring Internet Key Exchange (IKE) protocol data traffic to determine whether the first encryption key is exchanged.

4. A method for enabling a firewall to selectively monitor encrypted data traffic, the method comprising:

detecting, at a firewall, an exchange of a first encryption key between a host device and a remote device, wherein the first encryption key enables confidentiality protection of first data exchanged between the host device and the remote device according to a first security policy, and wherein detecting the exchange is initiated by the firewall;

exchanging a second encryption key between the firewall and the host device when the exchange of the first key is detected at the firewall, wherein the exchange of the second encryption key enables confidentiality protection of second data exchanged between the firewall and the host device according to a second security policy;

requesting, at the firewall, based at least in part upon the second security policy, the first encryption key from the host device wherein the first encryption key is sent under the protection of the second encryption key and in accordance with the second security policy; and decrypting encrypted data, at the firewall, using the first encryption key, according to a predetermined monitoring policy.

5. A method for enabling a firewall to selectively pass protocols and services, the method comprising:

detecting, at a firewall, an exchange of a first encryption key between a host device and a remote device, wherein the first encryption key supports confidentiality protection of first data exchanged between the host device and the remote device according to a first security policy, and wherein detecting the exchange is initiated by the firewall;

exchanging a second encryption key between the firewall and the host device when the exchange of the first encryption key is detected at the firewall, wherein the exchange of the second encryption key supports confidentiality protection of second data exchanged between the firewall and the host device according to a second security policy;

requesting, at the firewall, based at least in part upon the second security policy, the first encryption key from the host device, wherein the first encryption key is sent under the protection of the second encryption key and in accordance with the second security policy;

decrypting encrypted data, at the firewall, using the first encryption key; and applying a predetermined filtering policy to the decrypted data.

6. The method of claim 5, further comprising:
re-encrypting the decrypted data.

7. A firewall apparatus that securely passes encrypted data, the apparatus comprising:

an exchange detector, at a firewall, for detecting an exchange of a first encryption key between a host device and a remote device, wherein the first encryption key supports confidentiality protection of first data exchanged between the host device and the remote device according to a first security policy, and wherein detecting the exchange is initiated by the exchange detector;

a key exchanger, at the firewall, for exchanging a second encryption key between the firewall and host device when the exchange of the first encryption key is detected at the firewall, wherein the exchange of the second encryption key supports confidentiality protection of second data exchanged between the firewall and the host device according to a second security policy;

a key requester, at the firewall, for requesting, based at least in part upon the second security policy, the first encryption key from the host device, wherein the first encryption key is sent under the protection of the second encryption key and in accordance with the second security policy; and an encrypted data passer, at the firewall, for passing encrypted data when it is determined that the first encryption key is received.

8. The apparatus of claim 7, further comprising:
an encrypted data blocker for not allowing encrypted data to pass when it is determined that the first encryption key is not received.

9. The apparatus of claim 7, wherein the exchange detector further comprises:
a monitor for monitoring Internet Key Exchange (IKE) protocol data traffic to determine whether the first encryption key is exchanged.

10. A firewall apparatus for selectively monitoring encrypted data traffic, the apparatus comprising:

an exchange detector, at a firewall, for detecting an exchange of a first encryption key between a host device and a remote device, wherein the first encryption key enables confidentiality protection of first data exchanged between the host device and the remote device according to a first security policy, and wherein detecting the exchange is initiated by the exchange detector;

a key exchanger, at the firewall, for exchanging a second encryption key with the host device when the exchange of the first key is detected, wherein the exchange of the second encryption key enables confidentiality protection of second data exchanged between the firewall and the host device according to a second security policy;

a requester, at the firewall, for requesting, based at least in part upon the second security policy, the first encryption key from the host device wherein the first encryption key is sent under the protection of the second encryption key and in accordance with the second security policy; and a decryptor, at the firewall, for decrypting encrypted data, using the first encryption key, according to a predetermined monitoring policy.

11. A firewall apparatus for selectively passing protocols and services, the method comprising:

an exchange detector, at a firewall, for detecting an exchange of a first encryption key between a host device and a remote device, wherein the first encryption key supports confidentiality protection of first data exchanged between the host device and the remote device according to a first security policy, and wherein detecting the exchange is initiated by the exchange detector;

a key exchanger, at the firewall, for exchanging a second encryption key with the host device when the exchange of the first encryption key is detected, wherein the exchange of the second encryption key supports confidentiality protection of second data exchanged between the firewall and the host device according to a second security policy;

a requester, at the firewall, for requesting, based at least in part upon the second security policy, the first encryption key from the host device, wherein the first encryption key is sent under the protection of the second encryption key and in accordance with the second security policy;

a decryptor, at the firewall, for decrypting encrypted data, using the first encryption key; and a filter, at the firewall, for applying a predetermined filtering policy to the decrypted data.

12. The apparatus of claim 11, further comprising:
an encryptor for re-encrypting the decrypted data.

* * * * *